United States Patent
Burckhardt et al.

(10) Patent No.: US 9,834,639 B2
(45) Date of Patent: *Dec. 5, 2017

(54) CURING AGENT FOR MOISTURE-CURING COMPOSITIONS

(75) Inventors: Urs Burckhardt, Zurich (CH); Steffen Kelch, Oberengstringen (CH); Ulrich Wolf, Laax (CH)

(73) Assignee: SIKA TECHNOLOGY AG, Baar (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/232,702

(22) PCT Filed: Aug. 24, 2012

(86) PCT No.: PCT/EP2012/066553
§ 371 (c)(1),
(2), (4) Date: Jan. 14, 2014

(87) PCT Pub. No.: WO2013/030136
PCT Pub. Date: Mar. 7, 2013

(65) Prior Publication Data
US 2014/0128507 A1    May 8, 2014

(30) Foreign Application Priority Data

Aug. 26, 2011  (EP) ..................................... 11179080

(51) Int. Cl.
| | | |
|---|---|---|
| *C09J 175/04* | (2006.01) |
| *C09J 163/00* | (2006.01) |
| *C09J 183/00* | (2006.01) |
| *C08G 18/00* | (2006.01) |
| *C08G 18/10* | (2006.01) |
| *C08G 18/83* | (2006.01) |
| *C08G 59/02* | (2006.01) |
| *C08G 59/40* | (2006.01) |
| *C09D 175/04* | (2006.01) |
| *C09D 163/00* | (2006.01) |
| *C09D 183/00* | (2006.01) |
| *C09K 3/10* | (2006.01) |
| *C09D 201/10* | (2006.01) |
| *C09J 201/10* | (2006.01) |
| *C09D 201/02* | (2006.01) |
| *C09J 201/02* | (2006.01) |
| *C09J 183/04* | (2006.01) |
| *C08L 83/06* | (2006.01) |
| *C08G 59/36* | (2006.01) |
| *C08L 75/04* | (2006.01) |
| *C08L 63/00* | (2006.01) |
| *C08L 75/00* | (2006.01) |
| *C08L 83/00* | (2006.01) |

(52) U.S. Cl.
CPC ............ *C08G 59/02* (2013.01); *C08G 18/10* (2013.01); *C08G 18/831* (2013.01); *C08G 59/36* (2013.01); *C08L 75/04* (2013.01); *C08L 83/06* (2013.01); *C09D 163/00* (2013.01); *C09D 175/04* (2013.01); *C09D 201/025* (2013.01); *C09D 201/10* (2013.01); *C09J 163/00* (2013.01); *C09J 175/04* (2013.01); *C09J 183/04* (2013.01); *C09J 201/025* (2013.01); *C09J 201/10* (2013.01); *C08L 63/00* (2013.01); *C08L 75/00* (2013.01); *C08L 83/00* (2013.01)

(58) Field of Classification Search
CPC .......... C08L 63/00–63/10; C08L 75/04; C08L 83/06; C08L 101/025; C08L 101/10; C09D 163/00–163/10; C09D 175/04; C09D 183/06; C09D 201/025; C09D 201/10; C09J 163/00–163/10; C09J 175/04; C09J 183/06; C09J 201/025; C09J 201/10; C08G 18/302–18/307; C08G 18/10

See application file for complete search history.

(56) References Cited

U.S. PATENT DOCUMENTS

| 4,334,036 | A | * | 6/1982 | Yonezawa | ................. C08F 8/42 525/100 |
|---|---|---|---|---|---|
| 4,469,857 | A | | 9/1984 | John | |
| 4,889,915 | A | * | 12/1989 | Brauer | ................... C09J 175/04 524/590 |
| 5,194,488 | A | | 3/1993 | Piestert et al. | |
| 5,300,594 | A | * | 4/1994 | Durvasula | ............ C07D 303/24 525/502 |
| 5,314,971 | A | * | 5/1994 | Neffgen | ................. C08G 18/58 523/403 |
| 5,908,358 | A | | 6/1999 | Wu | |

(Continued)

FOREIGN PATENT DOCUMENTS

| EP | 0 186 191 A2 | 7/1986 |
|---|---|---|
| EP | 0 371 370 A1 | 6/1990 |

(Continued)

OTHER PUBLICATIONS

Machine translation of JP 08269300 A.*

(Continued)

*Primary Examiner* — Kregg Brooks
(74) *Attorney, Agent, or Firm* — Oliff PLC

(57) ABSTRACT

The present invention relates to a curing agent for moisture-curing compositions which includes at least one aqueous emulsion of at least one epoxy resin. Curing agents according to the invention are especially used for the accelerated curing of moisture-curing compositions which are based on polyurethane polymers that have isocyanate groups or of silane-functional polymers.

18 Claims, No Drawings

(56) References Cited

U.S. PATENT DOCUMENTS

| | | | | |
|---|---|---|---|---|
| 5,952,071 A | * | 9/1999 | Rijsdijk | B32B 27/08 427/516 |
| 2010/0279121 A1 | * | 11/2010 | Burckhardt | C08G 18/10 428/423.1 |
| 2011/0027591 A1 | * | 2/2011 | Braun | C08G 59/50 428/414 |
| 2011/0077345 A1 | * | 3/2011 | Erdem | C08G 18/12 524/500 |
| 2014/0179830 A1 | | 6/2014 | Burckhardt et al. | |

FOREIGN PATENT DOCUMENTS

| | | | |
|---|---|---|---|
| GB | 1097880 | | 1/1968 |
| JP | S61-268720 A | | 11/1986 |
| JP | 08269300 A | * | 10/1996 |
| JP | H09-279047 A | | 10/1997 |
| JP | 2001-131465 A | | 5/2001 |
| JP | 2001261784 A | * | 9/2001 |
| JP | 2007-284518 A | | 11/2007 |
| JP | 2014-529650 A | | 11/2014 |
| WO | WO 03/059978 A1 | | 7/2003 |

OTHER PUBLICATIONS

Machine translation of JP 2001261784 A.*
Machine translation of JP 2001-261874 A.*
Sika Ultrafast II Product Data Sheet (2003).*
Air Products, Ancarez AR550 Waterborne Epoxy Resin Technical Bulletin (2010).*
Air Products Anquamine 419 Curing Agent Technical Bulletin (2010).*
Sikaflex 552-AT Product Data Sheet (2010).*
Mar. 13, 2014 Translation of International Preliminary Report on Patentability issued in International Application No. PCT/EP2012/066553.
Jan. 17, 2013 International Search Report issued in International Application No. PCT/EP2012/066553 (with translation).
Dec. 28, 2015 Notification of the Second Office Action issued in Chinese Application No. 201280035432.5.
Jun. 9, 2016 Office Action issued in U.S. Appl. No. 14/235,582.
May 31, 2016 Notice of Reasons for Rejection issued in Japanese Patent Application No. 2014-526516.
Aug. 30, 2016 Office Action issued in Japanese Patent Application No. 2014-526518.
Mar. 21, 2017 Office Action Issued in U.S Appl. No. 14/235,582.
Hexion Inc., Epon 828 Technical Data Sheet (2005).
Jan. 17, 2017 Office Action issued in Japanese Patent Application No. 2014-526516.
Sep. 13, 2016 Office Action issued in Chinese Patent Application No. 201280035432.5.
Apr. 18, 2017 Office Action issued in Japanese Patent Application No. 2014-526518.

* cited by examiner

CURING AGENT FOR MOISTURE-CURING COMPOSITIONS

TECHNICAL FIELD

The invention relates to a curing agent for moisture-curing compositions such as those typically used in the field of adhesives, sealing compounds or coatings.

PRIOR ART

It is known that curing of moisture-curing compositions can be accelerated by additionally adding to them in application a component containing water in free or bound form. Examples of such water-based components can be found in U.S. Pat. No. 4,469,857, EP 0371370, U.S. Pat. No. 5,194,488 or WO 03/059978, for example.

In the components described there, the water is bound to a carrier material. The carrier materials that are used and generally have an ionic or at least strongly polar character are often not sufficiently compatible with the matrix of the moisture-curing compositions to which they have been added for accelerating the process. Consequently, introduction of the curing agent into the moisture-curing composition is difficult and may result in inhomogeneities within the composition. The application properties of the composition may therefore be impaired, on the one hand, while on the other hand, this is incompatibility may result in a reduced strength or stability of the fully cured composition. With some carrier materials, the water is also released from the carrier material gradually or only at an elevated temperature, which can greatly prolong the curing rate at ambient temperature.

SUMMARY OF THE INVENTION

The objective of the present invention is therefore to provide a curing agent with the help of which a moisture-curing composition can be cured at an accelerated rate and thereby build up strength rapidly, namely largely independently of the external conditions of the application, the substrates and the geometry of the adhesive bond. The curing agent should not have any negative effect on the composition, neither in its application properties nor in its use properties after curing.

According to the invention, this object is achieved by a curing agent according to claim 1.

It has surprisingly been found that the combination of a moisture-curing composition in a nonaqueous system with a curing agent based on an aqueous emulsion of at least one epoxy resin does not lead to any compatibility problems that could result in demixing and microscopic phase separation. Instead, compositions cured by means of curing agents according to the invention are characterized by good mechanical properties.

In addition, it has surprisingly been found that the curing agent according to the invention can be enriched with additional ingredients such as rheology aids and fillers without impairing its stability in storage. Furthermore, it has been found that the application properties of the moisture-curing composition do not deteriorate as a result of adding the curing agent, as expected, but on the contrary, they actually improve in that a better stability is observed and a shorter threads are formed at the nozzle.

Additional aspects of the present invention are the subject matter of additional independent claims. Especially preferred embodiments of the invention are the subject matter of the dependent claims.

METHODS FOR IMPLEMENTING THE INVENTION

The present invention relates to curing agent for moisture-curing compositions comprising at least one aqueous emulsion of at least one epoxy resin.

Substance names beginning with "poly" such as polyol or polyisocyanate in the present document refer to substances that formally contain two or more of the functional groups occurring in their name. The term "polymer" in the present document includes, on the one hand, a collection of macromolecules that are uniform chemically but differ with respect to the degree of polymerization, the molecular weight and the chain length and were synthesized by a polyreaction (polymerization, polyaddition, polycondensation). On the other hand, this term also includes derivatives of such a group of macromolecules of polyreactions, i.e., compounds obtained by reactions, such as additions or substitutions of functional groups on given macromolecules and they may be chemically uniform or chemically heterogeneous. This term also includes so-called prepolymers, i.e., reactive oligomeric preadducts, whose functional groups are involved in the synthesis of macromolecules.

The term "polyurethane polymer" includes all polymers synthesized by the so-called diisocyanate polyaddition process. This also includes polymers which are almost or entirely free of urethane groups. Examples of polyurethane polymers include polyether polyurethanes, polyester polyurethanes, polyether polyureas, polyureas, polyester polyureas, polyisocyanurates and polycarbodiimides.

In the present document, the terms "silane" and "organosilane" refer to compounds which, on the one hand, have at least one, usually two or three, alkoxy groups or acyloxy groups bound directly to the silicon atom by Si—O bonds and, on the other hand, at least one organic radical bound directly to the silicon atom by an Si—C bond. Those skilled in the art are also familiar with such silanes as organoalkoxysilanes and/or organoacyloxysilanes.

Accordingly, the term "silane group" refers to the silicon-containing group bound to the organic radical of the silane via the Si—C bond. The silanes and/or their silane groups have the property of undergoing hydrolysis on coming in contact with moisture. In doing so, organosilanols are formed, i.e., organosilicon compounds containing one or more silanol groups (Si—OH groups) and, for subsequent condensation reactions, organosiloxanes, i.e., organosilicon compounds containing one or more siloxane groups (Si—O—Si groups). The term "silane functional" denotes compounds containing silane groups. "Silane-functional polymers" are thus polymers containing at least one silane group.

Organosilanes, in which the organic radical has an amino group and/or a mercapto group, are referred to as "aminosilanes" and/or "mercaptosilanes." "Primary aminosilanes" are aminosilanes having a primary amino group, i.e., an $NH_2$ group bound to an organic radical. "Secondary aminosilanes" are aminosilanes having a secondary amino group, i.e., an NH group bound to two organic radicals.

"Molecular weight" is always understood in the present document to refer to the average molecular weight $M_n$ (number average).

"Room temperature" in the present document refers to a temperature of 23° C.

The curing agent according to the invention includes at least one aqueous emulsion of at least one epoxy resin.

The epoxy resin is preferably a liquid resin. Preferred epoxy liquid resins are those of formula (1)

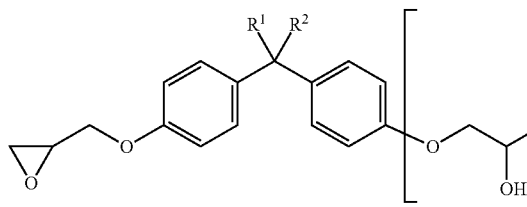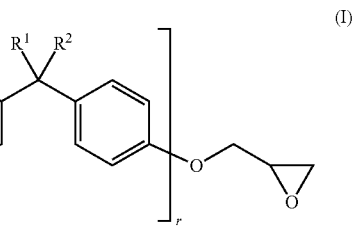

(I)

where the substituents $R^1$ and $R^2$, independently of one another, stand for either H or $CH_3$. In addition, the index r stands for a value from 0 to 1. Preferably r stands for a value of ≤0.2.

This therefore preferably refers to diglycidyl ethers of bisphenol A (DGEBA), of bisphenol F and of bisphenol A/F. The designation "A/F" here refers to a mixture of acetone and formaldehyde which is used as a starting material in the synthesis of bisphenol A/F. Suitable liquid resins are available commercially under the brand names Araldite® GY 250, Araldite® GY 282, Araldite® PY304 from Huntsman International LLC, USA or D.E.R.® 330 or D.E.R.® 331 from Dow Chemical Company, USA, or the brand name Epikote® 828 or Epikote® 862 from Hexion Specialty Chemicals, Inc., USA.

The epoxy resin is typically present in an unmodified form. In particular it is not modified with regard to better emulsifiability with a fatty acid, for example.

The aqueous emulsion of at least one epoxy resin optionally contains at least one reactive diluent. Suitable reactive diluents include in particular monofunctional epoxies, preferably glycidylized fatty alcohols.

The emulsion additionally preferably contains at least one external emulsifier, in particular a nonionic emulsifier, for example, a fatty alcohol ethoxylate.

The emulsion preferably contains an emulsifier in the amount of ≤10 wt %, in particular ≤5 wt %.

The emulsion preferably has a solids content of 60 to 90 wt %, in particular 70 to 90 wt %, preferably 75 to 85 wt %. Accordingly, the aqueous emulsion of at least one epoxy resin contains in particular approx. 10 to 40 wt %, in particular 10 to 30 wt %, preferably 15 to 25 wt % water.

The average particle size (droplet diameter) of the emulsion is in particular in the range of 0.05 to 10 μm, in particular from 0.1 to 7 μm, especially preferably from 0.2 to 5 μm. The emulsion preferably has a narrow particle size distribution, where the size ratio of the largest particles to the smallest particles has a value in the range of ≤25, preferably ≤20. In particular the particle size distribution is such that 90% of the particles in the emulsion are smaller than 6 μm, preferably smaller than 4 μm, especially preferably smaller than 3 μm.

Due to the small average particle size and the narrow particle size distribution, the emulsion has a low tendency to separate or sediment and is thus has good long-term storage stability.

The emulsion is preferably prepared in a continuous process, in particular by means of a stator-rotor mixer. Those skilled in the art are familiar with such a process. The advantages of this synthesis process include in particular the fact that the emulsion can be prepared without the addition of solvents, even at a relatively high viscosity of the epoxy resin.

It is also advantageous that high to very high solids contents are possible with small particle sizes having a narrow particle size distribution due to the fact that the process is carried out close to the phase inversion point, so emulsions with especially good storage stability can be obtained.

Additional advantages of the process described here include the fact that the emulsion heats up very little due to this process and can be produced inexpensively.

The production process is usually performed without the addition of solvents.

In addition, the present invention relates to the use of an aqueous emulsion of at least one epoxy resin as the curing agent for moisture-curing compositions, in particular from moisture-curing adhesives, sealing compounds or coatings.

The moisture-curing compositions are in particular compositions based on polyurethane polymers containing isocyanate groups or compositions based on silane-functional polymers.

In addition, the present invention relates to a process for at least partially curing a moisture-curing composition, wherein the moisture-curing composition is mixed with the curing agent according to the preceding description.

The present invention also relates to a two-component composition consisting of a component A, comprising:
at least one moisture-curing composition and a component B, comprising:
at least one curing agent, as described above.

The moisture-curing composition, which is contained in component A, comprises at least one crosslinkable polymer that can be crosslinked by contact with water, optionally in the presence of other ingredients such as crosslinking agents, catalysts and the like.

In one embodiment of the present invention, the crosslinkable polymer is a polyurethane polymer that contains isocyanate groups and can be obtained in particular by reaction of at least one polyol with at least one polyisocyanate.

Suitable polyols include in particular polyether polyols, polyester polyols, polycarbonate polyols, polyacrylate polyols and hydrocarbon polyols, preferably polyether polyols. Preferred polyether polyols includes polyoxypropylene polyols and polyoxypropylene polyoxyethylene polyols, in particular the diols and triols. Suitable polyisocyanates include in particular diisocyanates. Preferred diisocyanates include 1,6-hexamethylene diisocyanate (HDI), 1-isocyanato-3,3,5-trimethyl-5-isocyanatomethylcyclohexane (isophorone diisocyanate or IPDI), perhydro-2,4'- and -4,4'-diphenylmethane diisocyanate (HMDI or $H_{12}$MDI), toluene 2,4- and 2,6-diisocyanate and any mixtures of these isomers (TDI) as well as 4,4'-, 2,4'- and 2,2'-diphenylmethane diisocyanate and any mixtures of these isomers (MDI).

The polyurethane polymer is synthesized by known methods. It has a molecular weight of 500 to 50,000 g/mol, preferably between 1000 and 30,000 g/mol. In addition, the polyurethane polymer preferably has an average NCO functionality of 1.8 to 3.

In another embodiment of the invention, the crosslinkable polymer is a silane-functional polymer, in particular a silane-terminated polyether, a silane-terminated poly(meth) acrylate or a silane-terminated polyurethane. Such polymers can be obtained in particular by reaction of a polyol with an isocyanatosilane, by reaction of a prepolymer containing isocyanate groups with an aminosilane, hydroxysilane or mercaptosilane, by reaction of an aminosilane with a (meth) acryl silane or by reaction of a (meth)acryl-terminated polymer with an aminosilane or mercaptosilane.

A preferred silane-functional polymer is the reaction product of an optionally chain-lengthened isocyanate group-terminated polymer with an aminosilane, in particular a secondary aminosilane. For this reaction preferred secondary aminosilanes are alkylaminosilanes, for example, a 3-(n-butylamino)propyl alkoxysilane or a bis(alkoxysilylpropyl)amine and in particular Michael adducts of primary aminosilanes with Michael acceptors such as acrylonitrile, (meth)acrylates and maleic acid esters and amides. Preferred Michael adducts include the reaction products of primary aminosilanes, in particular 3-aminopropyltrialkoxysilanes with acrylates, for example, n-butyl acrylate or isobornyl acrylate and in particular maleic acid dialkyl esters. Most preferred are the Michael adducts of 3-aminopropyl dialkoxyalkylsilanes or 3-aminopropyl trialkoxysilanes with maleic acid dialkyl esters, in particular maleic acid diethyl ester.

The silane groups are in particular dialkoxyalkylsilane groups and preferably trialkoxysilane groups. Preferred alkoxy groups on the silane groups are ethoxy groups and in particular methoxy groups.

Suitable silane-functional polymers are commercially available, for example, under the brand names Polymer ST, for example, Polymer ST50 from the company Hanse Chemie AG, Germany, as well as the brand names Desmoseal® from the company Bayer MaterialScience AG, Germany.

Other suitable silane-functional polymers are commercially available under the brand names SPUR+® 1010LM, 1015LM and 1050MM from the company Momentive Performance Materials Inc., USA as well as under the brand names Geniosil® STP-E15, STP-10 and STP-E35 from the company Wacker Chemie AG, Germany.

Also suitable are silane-functional polymers such as those commercially available under the brand names MS Polymer™ S203H, S303H, S227, S810, MA903 and S943, Silyl™ SAX220, SAX350, SAX400 and SAX725, Silyl™ SAT350 and SAT400 as well as XMAP™ SA100S and SA3105 from the company Kaneka Corp., Japan, as well as under the brand names Excestar® S2410, S2420, S3430, S3630, W2450 and MSX931 from the company Asahi Glass Co, Ltd., Japan.

Components A and B in particular contain additional ingredients such as fillers and reinforcing agents, pigments, plasticizers and/or diluents, curing agents and crosslinking agents, accelerators and catalysts, stabilizers, adhesion promoters, rheology aids, desiccants and the like. When using such additional ingredients, it is important to be sure that they are compatible with one another and with the respective component and do not enter into any premature reactions, in particular with the crosslinkable polymer and/or with the epoxy resin.

Component A optionally also contains at least one curing agent or accelerator for curing the epoxy resin.

If the crosslinkable polymer in component A is a polyurethane polymer containing isocyanate groups, then the curing agent or accelerator for epoxy resins is in particular a blocked amine, typically an amine that can be released thermally or hydrolytically.

If the crosslinkable polymer in component A is a silane-functional polymer, then the curing agent or accelerator for epoxy resins is selected in particular from tertiary polyamines, in particular pentamethyl diethylenetriamine, N,N-dimethyl-N'-(dimethylaminopropyl)-1,3-propanediamine, bis(2-dimethylaminoethyl)ether, bis(dimethylaminoethyl)piperazine, N,N'-dimethylpiperazine, 1,4-diazabicyclo[2.2.2]octane; Mannich bases, in particular dimethylaminomethylphenol, 2,4,6-tris(dimethylaminomethyl)phenol and 2,4,6-tris((3-(dimethylamino)propyl)aminomethyl)phenol as well as imidazoles, in particular 1-methylimidazole, 1-ethylimidazole, 1-vinylimidazole, 2-methylimidazole, 2-ethylimidazole, 2-isopropylimidazole, 2-heptadecylimidazole, 2-ethyl-4-methylimidazole and 1-benzyl-2-methylimidazole. The Mannich bases mentioned above are especially preferred.

The amount of optional curing agent or accelerator for epoxy resins is preferably 0.5 to 15 wt %, in particular 1 to 10 wt %, based on component A.

Component A of the composition according to the invention may also comprise compositions such as those which are available commercially as single-component moisture-curing compositions based on polyurethane polymers or silane-functional polymers containing isocyanate groups, which may be used in particular as adhesives, sealing compounds or coatings. Such compositions are available commercially from Sika Schweiz AG under the brand names Sikaflex® or SikaBond®, for example.

In addition to the aqueous emulsion of at least one epoxy resin, component B also optionally contains a silane, which is selected from the group consisting of epoxy silane, in particular 3-glycidoxypropyl dimethoxymethylsilane, 3-glycidoxypropyltrimethoxysilane or 3-glycidoxypropyl triethoxysilane, (meth)acryl silane, in particular 3-methacryloxypropyl trimethoxysilane and anhydrosilane, in particular (trimethoxysilyl)propylsuccinic acid anhydride or 3-(triethoxysilyl)propylsuccinic acid anhydride. The silane in component B is preferably an epoxy silane or a (meth) acryl silane.

The use of such a silane in component B of the composition according to the invention may result in an improved compatibility of the different phases after mixing the components.

If the crosslinkable polymer in component A is a silane-functional polymer, then the silane may also cause a covalent bonding of the silane-functional polymer to the epoxy resin.

If the crosslinkable polymer in component A is a polyurethane polymer containing isocyanate groups, then this covalent bond can be produced by using blocked amines.

In addition, component B optionally contains in particular a rheology aid or a filler, in particular pyrogenic silicic acids and ureas.

Component A of the two-component composition described above is synthesized and stored in the absence of moisture. In this form, component A is stable in storage, i.e., it can be stored for a period of several months up to a year or even more in the absence of moisture, when contained in a suitable package or configuration, without any changes in its application properties or post-curing properties to an extent that would be relevant for its use.

Component B is typically also stable in storage under atmospheric conditions. The two components A and B are preferably stored at room temperature in an air-permeable container, where the container for component A is made in particular of plastic (polyolefin) or metal (aluminum) coated on the inside.

Immediately before or during application of the two-component composition, the components A and B are mixed together by stirring, kneading, rolling or the like, for example, but in particular by means of a static mixer or the help of a dynamic mixer. Component A then comes in contact with the water of the aqueous emulsion of at least one epoxy resin from component B, which results in crosslinking of the crosslinkable polymer in the composition.

In application of the two-component composition, the component B is preferably used in a ratio to component A, such that at least 50%, preferably 100% of all the reactive groups of the crosslinkable polymer in the entire two-component composition can be reacted with the water present in component B.

The two-component composition according to the invention is used in particular so that the weight ratio of component A to component B is ≥1:1, in particular 100:0.5 to 100:50, preferably 100:0.5 to 100:20.

Contact of the two-component composition with water in the form of atmospheric humidity is not absolutely essential for curing but it may also facilitate curing. In particular the post-curing of the composition may take place by means of atmospheric humidity.

The curing of the two-component composition preferably takes place in particular at room temperature. In certain cases it may be advantageous to post-cure and/or fully cure the partially cured composition with the help of elevated temperature, for example, in the range of 40° C. to 100° C.

The curing of the composition takes place in particular in such a way that, on the one hand, an adequate pot life and/or open time is ensured, while, on the other hand, the curing proceeds to such an extent within a period of a few minutes to a few hours that the composition can be processed further and/or bond formed using the composition is self-supporting and can be transported.

If component A of the two-component composition additionally contains at least one curing agent or accelerator for epoxy resins, then typically the epoxy resin from component B will also cure during the mixing of component A with component B. The cured composition also develops a significantly greater strength as a result of this curing of the epoxy resin.

The curing agent according to the invention and/or the two-component composition according to the invention is/are preferably used for adhesive and sealing applications in the construction and fabrication industries as well as in automotive engineering, in particular for joint sealing, as a parquet adhesive, for adhesive attachment of add-on parts, seam sealing, cavity sealing, assembly, automotive body bonding, window pane bonding, roof sealing, etc. This is advantageous in particular when curing of a moisture-curing composition that is faster than it would be by means of atmospheric humidity alone is desired, for example, because of a short pot life in an adhesive process or preferably a short waiting time in the event of a repair, because of processing under unfavorable climate conditions such as a winter climate or a desert climate, because of the low water vapor permeability of the composition and/or the substrate, because of thick layer adhesive joints or because of an adhesive geometry which is unfavorable for the penetration of atmospheric humidity.

In particular the two-component compositions according to the invention are suitable for adhesive bonding, sealing or coating of substrates made of concrete, mortar, bricks, tiles, ceramics, plaster, natural rock such as granite or marble, glass, glass ceramics, metal or metal alloys such as aluminum, steel, nonferrous metals, galvanized metal, wood, plastics such as PVC, polycarbonate, polymethyl (meth) acrylate, polyesters, epoxy resin, composite materials, ink or paints.

In addition, the invention relates to a cured composition such as that obtainable from a two-component composition as described above by mixing component A with component B.

In addition, the invention relates to an article having an at least partially cured composition according to the preceding description, wherein this article is in particular a structure, an industrial material or a means of conveyance or a part thereof.

A list of examples of such articles includes buildings, glass facades, windows, baths, bathrooms, kitchens, roofs, bridges, tunnels, roads, automobiles, trucks, rail vehicles, buses, ships, mirrors, panes of glass, tubs, kitchen appliances, household appliances, dishwashing machines, washing machines, baking ovens, headlights, fog lights or solar panels such as photovoltaic or solar thermal energy modules.

EXAMPLES

Exemplary embodiments, which illustrate the invention described here in greater detail, are presented below. The invention is of course not limited to the exemplary embodiments described here.

Description of the Measurement Methods

The viscosity was measured on a thermostatically regulated cone-plate viscometer Physica UM (cone diameter 20 mm, cone angle 1°, cone tip-plate distance 0.05 mm, shear rate 10 to 1000 $s^{-1}$).

The average particle size was measured by laser diffraction on a Sympatec instrument with a HELOS laser diffraction sensor.

The standard strength and the threads at the nozzle were used as a measure of the application properties of the composition. To determine the stability, the composition was observed by means of a wooden spatula applied vertically to a piece of cardboard and observing the runoff behavior. The stability was evaluated as "good" if the composition would easily flow down within one minute; the result was evaluated as "very good" if the composition did not move at all. The threads at the nozzle were assessed qualitatively by applying the composition to a piece of cardboard attached to the wall by using a cartridge gun, then removing the cartridge gun by rapidly retracting it at the end of application and measuring the length of the thread remaining at the pull-away location.

To measure the tack-free time (skin-forming time), a small part of the composition at room temperature was applied to cardboard in a layer approx. 3 mm thick and then the time until no more residue would remain on the pipette when the surface of the composition was touched lightly by a pipette made of LDPE in a standard climate ("NK"; 23±1° C., 50±5% relative atmospheric humidity) was determined. The tensile strength, elongation at break and modulus of elasticity (E modulus) were determined in accordance with DIN EN 53504 (tensile speed 200 mm/min) on dumbbells 75 mm long with a web length of 30 mm and a web width of 4 mm, produced by punching out of films approx. 3 mm thick made of the composition cured in a standard climate. To test the early strength, the tensile shear strength was measured by means of the following method: For each measurement 2 KTL-lacquered steel plates 0.75 mm thick, 45 mm wide and 100 mm long (obtainable from Rocholl GmbH, Schönbrunn, Germany) degreased with isohexane were used for each measurement. After an airing time of 10 minutes, the plates were arranged with the help of a suitable PTFE mold at a vertical spacing of 2 mm from one another, so that they would overlap by 15 mm at the head ends. The overlap region between the plates was filled with adhesive, so that the adhesive came to lie on the degreased sides of the plates. The plates which were glued to one another in this way were stored at 23° C. and 50% relative atmospheric humidity, pulled apart after 2 and/or 4 and/or 24 hours with the help of a tensile testing machine (Zwick) at a constant transverse yoke rate of 10 mm/min in accordance with DIN EN 1465 until a break occurred, and then the breaking strength was measured in MPa (N/mm$^2$). The values given are averages of two measurements.

Moisture-Curing Compositions

Composition Z1: Sikaflex® 265 polyurethane glazing adhesive (obtainable from Sika Schweiz AG).

Composition Z2: component A of the mounting adhesive Sikaflex® 553 based on silane-terminated polymer (obtainable from Sika Schweiz AG).

Production of Curing Agents

Curing agent H1: 68.5 parts by weight bisphenol A liquid resin (Araldite® GY-250 from Huntsman) were mixed with 10 parts by weight reactive diluent (Araldite® DY-E from Huntsman) and 1.5 parts by weight emulsifier (Disponil® 23 from Cognis) at 50° C. and then emulsified continuously with 20 parts by weight water using a stator-rotor mixer at a rotational speed of 22 m/s. The resulting white emulsion had a creamy consistency, a viscosity of approx. 1100 mPa·s at 20° C., an epoxy group content of 4.08 mEq/g and an average particle size of approx. 1.6 µm, with 90% of the particles being smaller than 2.7 µm, and it remained unchanged for more than 1 year when stored at room temperature.

Curing agent H2: 68.5 parts by weight bisphenol A liquid resin (Araldite® GY-250 from Huntsman) and 10 parts by weight bisphenol F liquid resin (D.E.R.™ 354 from Dow Chemical) were mixed with 1.5 parts by weight emulsifier (Disponil® 23 from Cognis) at 50° C. and then emulsified continuously with 20 parts by weight water using a stator-rotor mixer at a rotational speed of 22 m/s. The resulting white emulsion had a creamy consistency, a viscosity of approx. 1500 mPa·s at 20° C., an epoxy group content of 4.28 mEq/g and an average particle size of approx. 1.5 µm, with 90% of the particles being smaller than 2.6 µm, and it remained unchanged for more than 1 year when stored at room temperature.

Curing agent H3: Accelerator paste Sika® Booster (obtainable from Sika Schweiz AG).

Curing agent H4: Component B (version L30) of the mounting adhesive Sikaflex® 553 (obtainable from Sika Schweiz AG).

Production of Accelerated Curing Compositions

Examples 1 to 4 and Ref 1 and Ref 2

For each example, a moisture-curing composition as component A was combined with a curing agent as component B in the weight ratio indicated according to Table 1 by means of a dynamic mixer, then applied directly and cured in a standard climate.

TABLE 1

| Accelerated curing compositions (amounts in parts by weight) | | | | | | |
|---|---|---|---|---|---|---|
| Example | Ref 1 | 1 | Ref 2 | 2 | 3 | 4 |
| Component A: | | | | | | |
| Composition Z1 | 100 | 100 | — | — | — | — |
| Composition Z2 | — | — | 100 | 100 | 100 | 100 |
| Component B: | | | | | | |
| Curing agent H1 | — | — | — | 2.5 | — | — |
| Curing agent H2 | — | 2 | — | — | 2.5 | 10 |

The resulting compositions were tested for stability, threads at nozzle, tack-free time and mechanical properties after 7 days of curing in a standard climate plus an additional 7 days of storage at 70° C.

Table 2 summarizes the results of these tests.

TABLE 2

| Properties of the compositions. | | | | | | |
|---|---|---|---|---|---|---|
| Example | Ref 1 | 1 | Ref 2 | 2 | 3 | 4 |
| Stability | good | very good | good | very good | very good | very good |
| Thread pull (mm) | 7 | 3 | 6 | 3 | 3 | 2 |
| Freedom from tackiness$^a$ | 60 | 38 | 30 | 30 | 32 | 41 |
| Mechanical properties (7 days in standard climate) | | | | | | |
| Tensile strength (MPa) | 8.4 | 7.0 | 2.4 | 2.5 | 2.5 | 3.1 |
| Elongation at break (%) | 500 | 450 | 270 | 280 | 260 | 500 |
| E modulus (MPa) | 2.0$^b$ | 2.4$^b$ | 1.5$^c$ | 1.5$^c$ | 1.6$^c$ | 1.0$^c$ |
| Mechanical properties (7 days at standard climate + 7 days at 70° C.) | | | | | | |
| Tensile strength (MPa) | 8.9 | 8.3 | 2.5 | 2.7 | 2.7 | 3.3 |
| Elongation at break (%) | 560 | 610 | 230 | 260 | 220 | 380 |
| E modulus (MPa) | 2.0$^b$ | 2.2$^b$ | 1.6$^c$ | 1.6$^c$ | 1.7$^c$ | 1.5$^c$ |

$^a$Tack-free time;
$^b$at 0.5 to 5% elongation;
$^c$at 0.5 to 50% elongation

Examples 5 and 6 as Well as Ref 3 to Ref 6

For each example, a moisture-curing composition as component A was mixed with a curing agent as component B in the stated weight ratio using a dynamic mixer in a standard climate according to Table 3, then applied immediately and cured in a standard climate.

TABLE 3

Accelerated curing compositions (amounts in parts by weight)

| Example | Ref 3 | Ref 4 | 5 | Ref 5 | Ref 6 | 6 |
|---|---|---|---|---|---|---|
| Component A: | | | | | | |
| Composition Z1 | 100 | 100 | 100 | — | — | — |
| Composition Z2 | — | — | — | 100 | 100 | 100 |
| Component B: | | | | | | |
| Curing agent H2 | — | — | 2 | — | — | 10 |
| Curing agent H3 | — | 2 | — | — | — | — |
| Curing agent H4 | — | — | — | — | 10 | — |

The resulting compositions were tested for early strength. The results of these tests are listed in Table 4.

TABLE 4

Early strength (in MPa) of the compositions (amounts in parts by weight); n.d. = not determined.

| Example | Ref 3 | Ref 4 | 5 | Ref 5 | Ref 6 | 6 |
|---|---|---|---|---|---|---|
| Early strength after 2 hours | n.d. | 1.2 | 0.8 | n.d. | 0.3 | 0.2 |
| Early strength after 4 hours | n.d. | 3.5 | 2.8 | n.d. | 0.8 | 0.5 |
| Early strength after 24 hours | 1.4 | 4.9 | 4.1 | 0.3 | 1.8 | 1.5 |

The invention claimed is:

1. A method of adhesive bonding, sealing, or coating a substrate, comprising:
   mixing a component A and a component B of a two-component composition together to obtain a curable composition;
   applying the curable composition to the substrate; and
   curing the curable composition applied to the substrate, wherein:
   component A, at a time of mixing, comprises, in a nonaqueous system, (i) at least one moisture-curing composition comprising at least one polyurethane polymer including isocyanate groups, and (ii) at least one curing agent or accelerator for curing an epoxy resin;
   component B, at a time of mixing, comprises at least one curing agent comprising at least one aqueous emulsion of at least one epoxy resin; and
   the weight ratio of component A to component B is 100:0.5 to 100:20.

2. The method according to claim 1, wherein the two-component composition is a moisture-curing adhesive, sealing agent or a moisture-curing coating.

3. The method according to claim 1, wherein the aqueous emulsion of at least one epoxy resin contains 10 to 40 wt % water.

4. The method according to claim 1, wherein the aqueous emulsion of at least one epoxy resin contains 10 to 30 wt % water.

5. The method according to claim 1, wherein the epoxy resin has an average particle size in the range of 0.05 to 10 µm.

6. The method according to claim 1, wherein the emulsion has a particle size distribution in which the size ratio of the largest particles to the smallest particles has a value in the range of <25.

7. The method according to claim 1, wherein 90% of the particles in the emulsion are smaller than 6 µm.

8. The method according to claim 1, wherein the at least one curing agent or accelerator for curing the epoxy resin is 0.5 to 15 wt % based on component A.

9. The method according to claim 1, wherein at least 50% of reactive groups of the at least one polyurethane polymer are reacted with water present in component B.

10. A method of adhesive bonding, sealing, or coating a substrate, comprising:
    mixing a component A and a component B of a two-component composition together to obtain a curable composition;
    applying the curable composition to the substrate; and
    curing the curable composition applied to the substrate, wherein:
    component A, at a time of mixing, comprises, in a nonaqueous system, (i) at least one moisture-curing composition comprising at least one silane-functional polymer, and (ii) at least one curing agent or accelerator for curing an epoxy resin;
    component B, at a time of mixing, comprises at least one curing agent comprising at least one aqueous emulsion including epoxy resin particles and an emulsifier formed by emulsifying at least one liquid epoxy resin in the presence of the emulsifier and water; and
    the weight ratio of component A to component B is 100:0.5 to 100:20.

11. The method according to claim 10, wherein the silane-functional polymer is a silane-terminated polyether or a silane-terminated poly(meth)acrylate.

12. The method according to claim 10, wherein the aqueous emulsion of at least one epoxy resin contains 10 to 40 wt % water.

13. The method according to claim 10, wherein the aqueous emulsion of at least one epoxy resin contains 10 to 30 wt % water.

14. The method according to claim 10, wherein the epoxy resin has an average particle size in the range of 0.05 to 10 µm.

15. The method according to claim 10, wherein the emulsion has a particle size distribution in which the size ratio of the largest particles to the smallest particles has a value in the range of <25.

16. The method according to claim 10, wherein 90% of the particles in the emulsion are smaller than 6 µm.

17. The method according to claim 10, wherein the at least one curing agent or accelerator for curing the epoxy resin is 0.5 to 15 wt % based on component A.

18. The method according to claim 10, wherein at least 50% of reactive groups of the at least one silane-functional polymer are reacted with water present in component B.

* * * * *